United States Patent [19]

Kobayashi et al.

[11] Patent Number: 4,820,963
[45] Date of Patent: Apr. 11, 1989

[54] DRIVING DEVICE FOR STEP MOTOR

[75] Inventors: Norio Kobayashi, Nagoya; Satoshi Yoshimoto, Komaki, both of Japan

[73] Assignee: Brother Kogyo Kabushiki Kaisha, Japan

[21] Appl. No.: 122,855

[22] Filed: Nov. 17, 1987

[30] Foreign Application Priority Data

Nov. 19, 1986 [JP] Japan .................................. 61-276253
Nov. 19, 1986 [JP] Japan .................................. 61-276254

[51] Int. Cl.$^4$ ............................................. H02I 8/00
[52] U.S. Cl. ...................................... 318/696; 318/685
[58] Field of Search .................................. 318/696, 685

[56] References Cited

U.S. PATENT DOCUMENTS 3,893,012  7/1975  Lim ..................................... 318/696
4,401,931  8/1983  Kulterman et al. ................. 318/696
4,558,268 12/1985  Besson et al. ....................... 318/696
4,661,755  4/1987  Suzuki ................................. 318/696
4,742,287  5/1988  Yokoi et al. ........................ 318/696

FOREIGN PATENT DOCUMENTS

0053684  6/1982  European Pat. Off. .

Primary Examiner—William M. Shoop, Jr.
Assistant Examiner—Saul M. Bergmann
Attorney, Agent, or Firm—Oliff & Berridge

[57] ABSTRACT

A step motor driving device comprises a single control circuit and a single voltage generating circuit for controlling plural step motors, each step motor being connected to a drive circuit. The control circuit outputs a control signal to the voltage generating circuit so that it selectively supplies high voltage and/or low voltage to the step motors. Therefore, the driving device of the present invention can control more than two step motors either jointly or individually by means of a simple circuit structure.

14 Claims, 7 Drawing Sheets

DRIVING DEVICE FOR STEP MOTOR

BACKGROUND OF THE INVENTION

The present invention relates to a driving device which actuates plural step motors.

A conventional driving device for a step motor alternatively supplies high voltage to the step motor so as to drive it, and supplies low voltage thereto so as to stop it. When plural step motors are to be controlled at the same time, each step motor must be provided with the conventional driving device so that it individually receives a control signal for driving or stopping the step motor. As a result, both the driving unit for the plural step motors and its control system are complicated.

SUMMARY OF THE INVENTION

It is accordingly an object of the present invention to provide a driving device which selectively drives and keeps still plural step motors by means of such a simple structure as a single control circuit connected with a single voltage generating circuit.

It is another object to decrease the number of outputs from the control circuit of the driving device and to reduce the manufacturing cost thereof.

It is still another object to provide a driving device which activates one step motor by high voltage while keeping the other step motor inactive by the same high voltage instead of low voltage so as to prevent a vibration of the activated step motor from affecting the inactive step motor.

It is also an object to provide a driving device which drives one step motor while keeping another step motor still by means of such a simple structure as a single control circuit and a single voltage generating circuit.

It is a further object to provide a driving device which improves the accuracy in restraining the inactive step motor and prevents the step motors from heating up.

These objects are attained by a driving device including a plurality of step motors comprising; a driver circuit connected to said respective motors; a voltage output means connected to said respective step motors for providing power to said respective step motors in order to activate one or more of said step motors; and control means for activating said voltage output means in response to a drive signal or a stop signal, and for activating said driver circuits in response to a drive control signal so that: one or more step motors is rotated by sequential activation of the coils of each said step motors; and any other step motors are stopped.

The objects are also attained by a driving device including a plurality of step motors comprising; a driver circuit connected to said respective motors; a voltage output means connected to said respective step motors and having two outputs, for both changing the output state of said two outputs and providing power to said respective step motors; and control means for activating said voltage output means in response to a drive signal or a stop signal, and for activating said driver circuits in response to a drive control signal so that: one or more step motors is rotated by sequential activation of the coils of each said step motors; and the other step motors are stopped.

BRIEF DESCRIPTION OF THE DRAWINGS

The present invention will be described in more detail with examples and references to the accompanying drawings, in which.

DETAILED DESCRIPTION OF THE PREFERRED EMBODIMENTS

Hereinafter, a driving device for step motors as a first embodiment of the present invention will be described in detail according to FIGS. 1 through 5.

Figure 1:
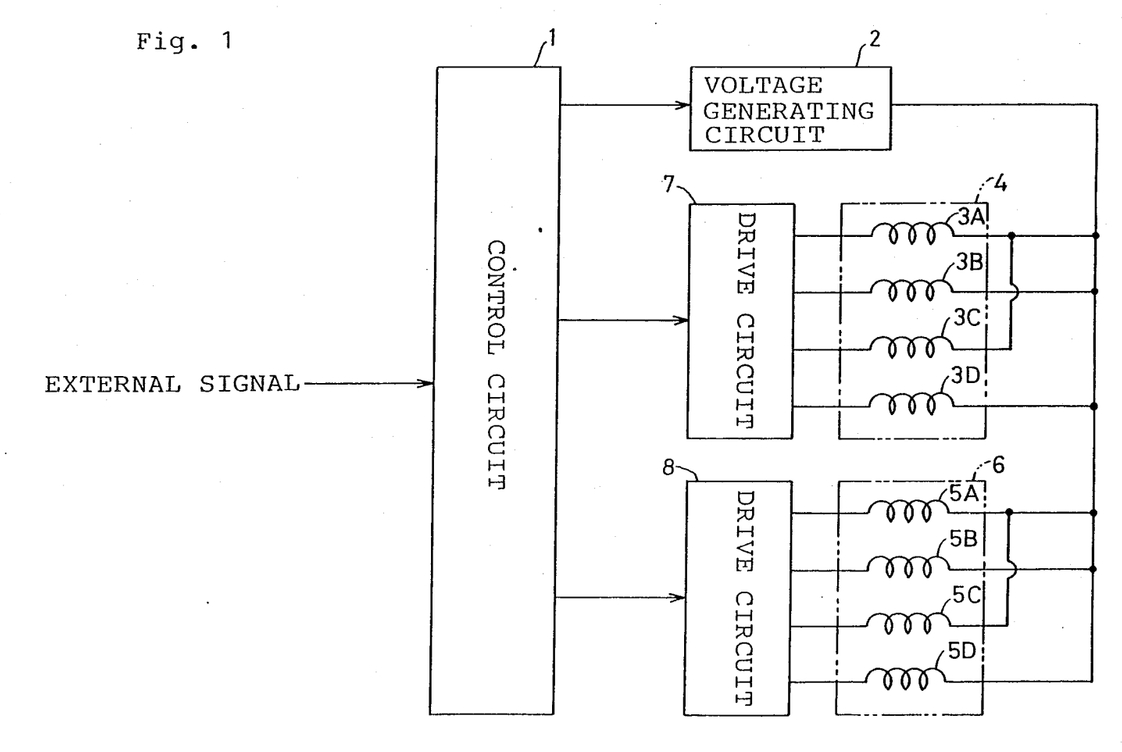
FIG. 1 is an electric block diagram of a driving device for step motors of a first embodiment of the present invention.
Figure 2:
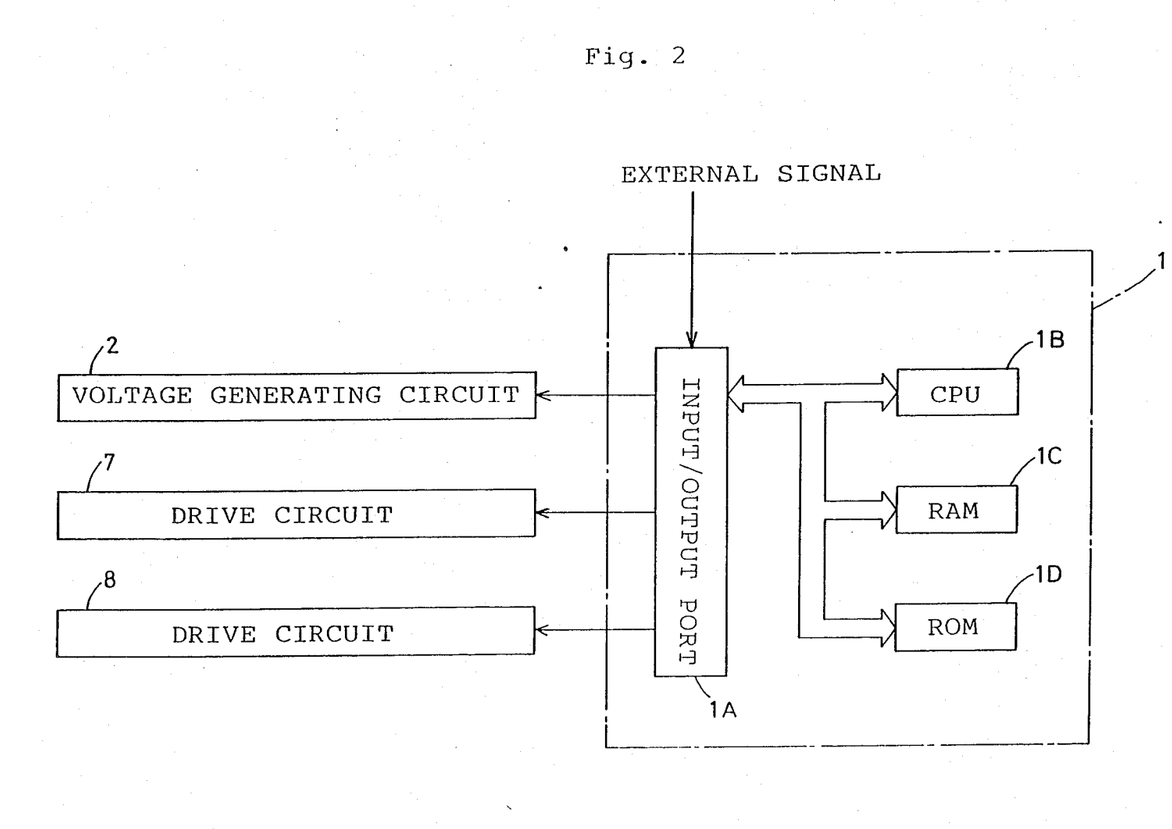
FIG. 2 is a schematic block diagram illustrating a control circuit of the first embodiment.

As shown in FIG. 1, a control circuit 1 is connected with a voltage generating circuit 2 and drive circuits 7 and 8. Referring to FIG. 2, the control circuit 1 comprises an input/output port 1A, a central processing unit 1B, a random access memory 1C, and a read only memory 1D. The input/output port 1A receives an external signal and then outputs converted signals respectively to the voltage generating circuit 2 and to the drive circuits 7 and 8.

Referring again to FIG. 1, the control circuit 1 outputs to the voltage generating circuit 2 a drive signal for driving a first step motor 4 and a second step motor 6, and a stop signal for stopping those step motors 4 and 6. The voltage generating circuit 2 outputs high DC voltage in response to the drive signal from the control circuit 1, and outputs low DC voltage in response to the stop signal therefrom. The voltage generating circuit 2 is connected with one end of each four coils 3A, 3B, 3C and 3D of the first step motor 4, and with one end of each four coils 5A, 5B, 5C and 5D of the second step motor 6. Thus, high DC voltage and low DC voltage from the voltage generating circuit 2 are selectively supplied to the coils 3A-3D and 5A-5D.

The other ends of the coils 3A-3D and 5A-5D are connected with the drive circuits 7 and 8, respectively. Synchronously with the drive signal output to the voltage generating circuit 2, the control circuit 1 also outputs a drive control signal to both drive circuits 7 and 8. In response to the drive control signal, the drive circuits 7 and 8 respectively switch the coils 3A-3D and 5A-5D into correspondence to the activation phase which is determined to follow the stop phase. Upon the energization of the coils 3A-3D and 5A-5D by the DC voltage from the voltage generating circuit 2, the step motors 4 and 6 are rotated.

Figure 3:
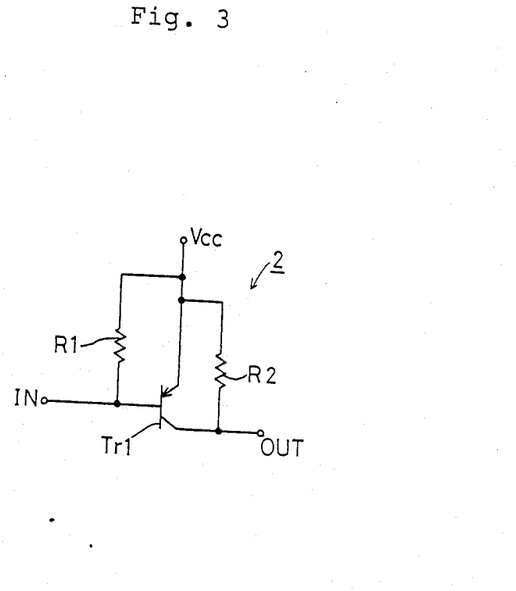
FIG. 3 is an electric circuit diagram for a voltage generating circuit of the first embodiment.

FIG. 3 shows an electric structure of the voltage generating circuit 2. An output terminal of the control circuit 1, shown by "IN", is connected with a base terminal of a transistor Tr1. A collector terminal of the transistor Tr1 is an output terminal of the voltage generating circuit 2, as shown by "OUT". A resistor R1 is connected between the base terminal and a voltage source Vcc of the transistor Tr1, and a resistor R5 is connected between the voltage source Vcc and the collector terminal thereof. When the control circuit 1 outputs a drive signal of positive potential to the output terminal in order to drive the step motors 4 and 6, the transistor Tr1 is activated. Accordingly, high voltage from the voltage source Vcc is supplied to the output terminal. On the other hand, when the control circuit 1 outputs a stop signal of zero potential to the output terminal in order to stop the step motors 4 and 6, the transistor Tr1 is inactivated and thus low voltage is supplied to the output terminal.

Figure 4:
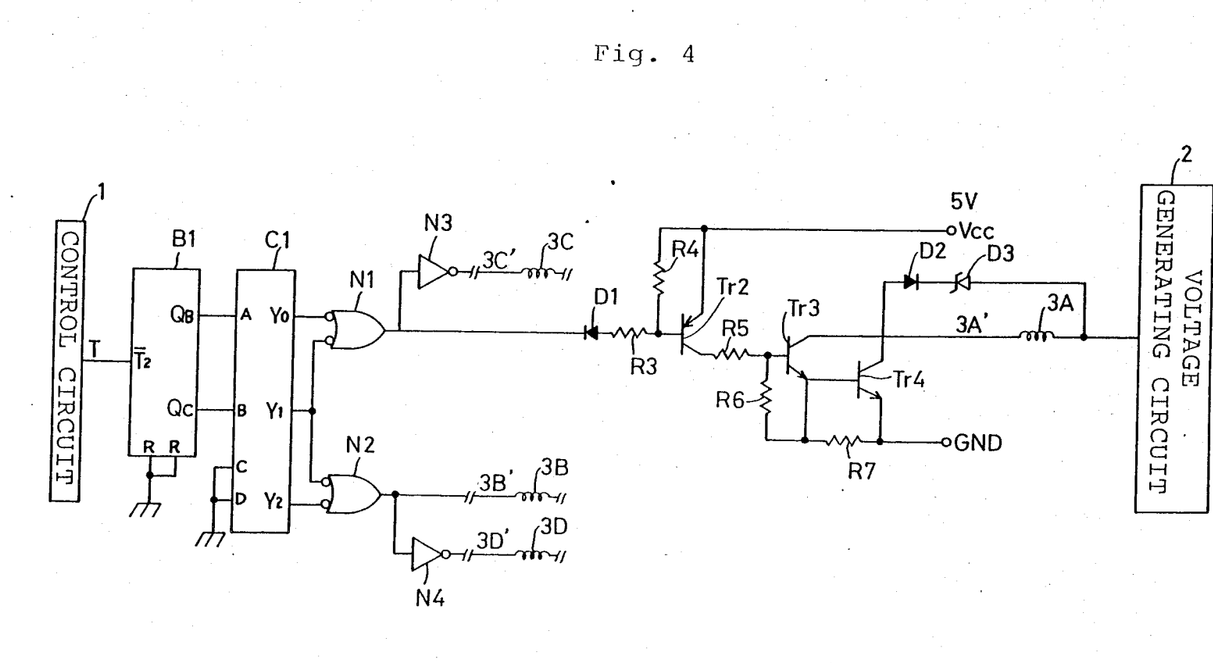
FIG. 4 is an electric circuit diagram explaining a drive circuit of the first embodiment.
Figure 5:
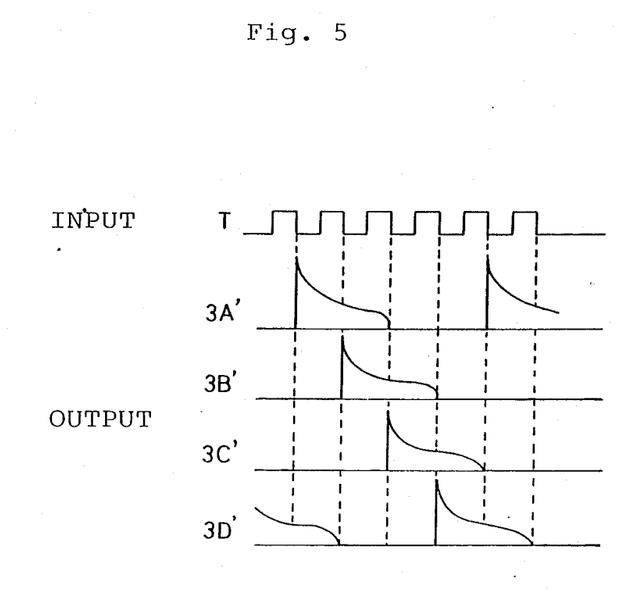
FIG. 5 is a sequence diagram showing input/output sequences of the drive circuit of the first embodiment.

An electric structure of the drive circuit 7 is illustrated in FIG. 4 wherein: B1 is a binary counter; C1 is a BCD-to-decimal decorder; N1 and N2 are NAND gates; N3 and N4 are NOT gates; D1 and D2 are diodes and D3 is a zener diode; R3-R7 are resistors; Tr3 and Tr4 are transistors; and 3A is one of the four coils. The diagram with respect to the other coils 3B, 3C and 3D in FIG. 4 is omitted since the electric structures thereof are the same as that of the coil 3A. The symbol "T" in FIG. 4 denotes an input signal, namely, a drive control signal generated from the control circuit 1 to the binary counter B1 in the drive circuit 7. FIG. 5 shows output states at the points 3A', 3B', 3C'and 3D' in FIG. 4; each corresponding to the input signal T for switching on each of the coils 3A-3D sequentially from coil to coil resulting in rotation of the step motors 4 and 6. With respect to an input signal for keeping the coils 3A-3D in the stop phase, sequence diagrams corresponding to FIG. 5 are omitted.

Another drive circuit 8 has the same electric structure and the same input/output sequences as the above-stated drive circuit 7 has.

Now, functions of the aforementioned driving device for the step motors will be explained in further detail.

When an external signal is input to the control circuit 1 in order to simultaneously drive the first and second step motors 4 and 6 for a determined period, the control circuit 1 outputs a drive signal to the voltage generating circuit 2, which accordingly outputs high DC voltage. Synchronously with the drive signal, the control circuit 1 also outputs a drive control signal to both drive circuits 7 and 8. In response to this drive control signal, the drive circuits 7 and 8 sequentially switch on each of the coils 3A-3D and each of the coils 5A-5D, activation being caused by high DC voltage from the voltage generating circuit 2. Then, step motors 4 and 6 are driven together for a determined period.

Alternatively, when another type of external signal is input to the control circuit 1 in order to drive the first step motor 4 and to restrain the second step motor 6 for a determined period, the control circuit 1 outputs a drive signal to the voltage generating circuit 2 which accordingly outputs high DC voltage. Synchronously with this drive signal, the control circuit 1 also outputs to the drive circuit 7 a drive control signal for driving the first step motor 4, and outputs to the drive circuit 8 a drive control signal for restraining the second step motor 6. In response to the drive control signal, the drive circuit 7 sequentially switches on each of the coils 3A-3D, activation resulting from high voltage from the voltage generating circuit 2. Thus, the first step motor 4 is driven for a determined period. On the other hand, in response to the drive control signal, the drive circuit 8 keeps the coils 5A14 5D in the stop phase, and its connected coils are constantly energized by high DC voltage from the voltage generating circuit 2. Thus, the second step motor 6 is kept inactive even by the same high voltage which causes the first step motor 4 to drive because the coils 5A-5D in this case are not switched on from coil to coil but kept in the stop phase.

Furthermore, when still another type of external signal is input to the control circuit 1 in order to stop both step motors 4 and 6, the control circuit 1 outputs a stop signal to the voltage generating circuit 2 which accordingly outputs low DC voltage. Synchronously with the stop signal, the control circuit 1 also outputs a drive control signal to both drive circuits 7 and 8. In response to this drive control signal, the coils 3A-3D and 5A-5D receive low DC voltage from the voltage generating circuit 2 so as to keep both step motors 4 and 6 inactive.

According to the aforementioned first embodiment of the present invention, the driving device for the step motors is able to drive the two step motors 4 and 6 by means of the single control circuit 1 and the single voltage generating circuit 2. As a result, the circuit structure of the driving device can be greatly simplified. Furthermore, when one step motor is driven by high voltage, the other step motor is kept inactive by high voltage instead of low voltage. Therefore, a vibration of the driven step motor never affects the step motor in its inactive phase.

While the step motor 6 is kept inactive and the step motor 4 is being driven in the first embodiment, the step motor 6 is constantly energized by high voltage without switching from coil to coil. However, the drive control signal, which is output from the control circuit 1 to the drive circuit 8, may control the coils 5A-5D to be energized intermittently. Such conditions prevent the energized coils 5A-5D from heating up.

Moreover, if no electrical restraining force is necessary in order to restrain the step motors, the stop control signal may control the coils 5A-5D not to be energized at all, so that the coils 5A-5D are never heated.

A second embodiment of the present invention will now be described with reference to FIGS. 6 and 7.

Figure 6:
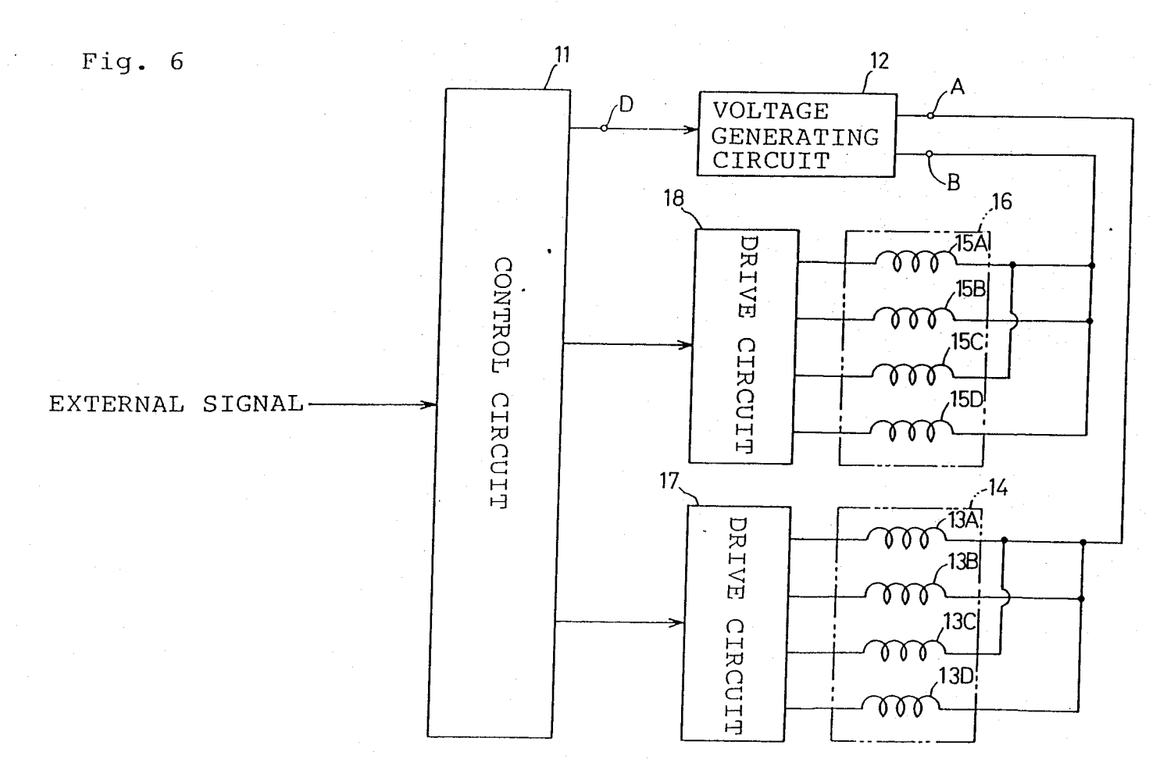
FIG. 6 is an electric block diagram of a driving device for step motors of a second embodiment of the present invention; ad
Figure 7:
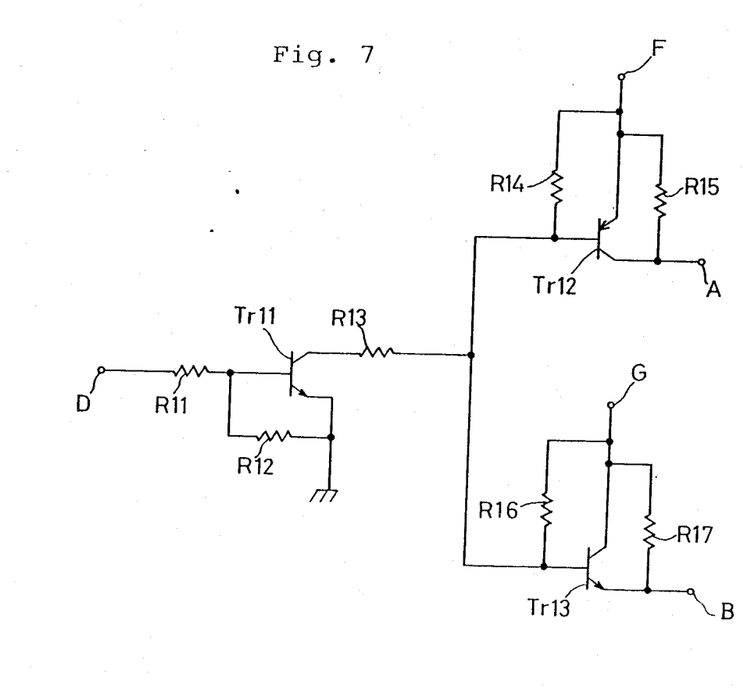
FIG. 7 is an electric circuit diagram for a voltage generating circuit of the second embodiment.

Referring to FIG. 6, a control circuit 11 with the same structure as the control circuit 1 in the first embodiment is connected with a voltage generating circuit 12 including a switching function. The control circuit 11 outputs a drive signal from its output terminal D to the voltage generating circuit 12 in order to drive a first step motor 14 or a second step motor 16.

The voltage generating circuit 12 comprises two output terminals A and B. When a drive signal is output from the control circuit 11 so as to drive only the first step motor 14, the voltage generating circuit 12 outputs high DC voltage from the output terminal A and low DC voltage from the output terminal B. Alternatively, when another drive signal is output so as to drive only the second step motor 16, he voltage generating circuit 12 outputs low DC voltage from the output terminal A and high DC voltage from the output terminal B.

The output terminal A of the voltage generating circuit 12 is connected with one end of each four coils 13A, 13B, 13C and 13D of the first step motor 14 so as to selectively supply DC voltage thereto. The output terminal B of the voltage generating circuit 12 is connected with one end of each four coils 15A, 15B, 15C and 15D of the second step motor 16, so as to selectively supply DC voltage thereto.

The other ends of the coils 13A-3D and 15A-5D are connected with drive circuits 17 and 18, respectively.

Synchronously with the drive signal output to the voltage generating circuit 12, the control circuit 11 also outputs a drive control signal to the drive circuits 17 and 18. In response to the drive control signal, the drive circuits 17 and 18 respectively switch on the coils 13A–3D and 15A–5D so that those coils correspond to the activation phase which is determined to follow the stop phase. Upon energization of the coils 13A–3D and 15A–5D by DC voltage from the voltage generating circuit 12, the step motors 14 and 16 are rotated.

Now, an electric structure of the voltage generating circuit 12 will be explained with reference to FIG. 7.

The output terminal D of the control circuit 11 is connected with a base terminal of a transistor Tr11 through a resistor R11. An emitter terminal of the transistor Tr11 is grounded. A resistor R12 is connected between the emitter terminal and the base terminal.

A collector terminal of the transistor Tr11 is connected with base terminals of a transistor Tr12 and a transistor Tr13 through a resistor R13. An emitter terminal F of the transistor Tr12 and a collector terminal G of the transistor Tr13 are supplied with source voltage of a same high value. A collector terminal of the transistor Tr12 is the output terminal A of the voltage generating circuit 12. An emitter terminal of the transistor Tr13 is the output terminal B thereof.

A resistor R14 is connected between the base terminal and the emitter terminal of the transistor Tr12, and a resistor R15 is connected between the emitter terminal and the collector terminal thereof. A resistor R16 is connected between the base terminal and the collector terminal of the transistor Tr13, and a resistor R17 is connected between the collector terminal and the emitter terminal thereof.

When the control circuit 11 outputs a drive signal of positive potential, i.e., a drive signal of "H" intensity to the output terminal D in order to drive the first step motor 14, both transistors Tr11 and Tr12 are activated. Thus, high source voltage from the emitter terminal F is supplied to the output terminal A through the transistor Tr12. The transistor Tr13, on the other hand, is inactivated, and thus low voltage from the collector terminal G is supplied to the output terminal B through the resistor R17.

When the control circuit 11 outputs another drive signal of zero potential, i.e., a drive signal of "L" intensity to the output terminal D in order to drive the second step motor 16, the transistor Tr12 is inactivated. Thus, low voltage from the emitter terminal F is supplied to the output terminal A through the resistor R15. The transistor Tr13, on the other hand, is activated, and thus high voltage from its collector terminal G is supplied to the output terminal B through the transistor Tr13.

The drive circuits 17 and 18 have the same electric structures and the same input/output sequence as the drive circuits 7 and 8 described with reference to FIGS. 4 and 5 in the first embodiment.

Hereinafter, functions of the drive circuits for the step motors will be explained in detail. When an external signal is input to the control circuit 11 in order to drive the first step motor 14 and to stop the second step motor 16 for a determined period, the control circuit 11 outputs a drive signal of "H" intensity from the output terminal D to the voltage generating circuit 12. As a result, the voltage generating circuit 12 outputs high DC voltage from the output terminal A and low DC voltage from the output terminal B. Synchronously with the drive signal of "H" intensity, the control circuit 11 also outputs to the drive circuit 17 a drive control signal for driving the first step motor 14, and outputs to the drive circuit 18 a drive control signal for keeping the second step motor 16 inactive. In response to the drive control signal, the drive circuit 17 sequentially switches on each of the coils 13A–3D from coil to coil, activation being caused by high DC voltage from the output terminal A of the voltage generating circuit 12. Thus, the first step motor 14 is driven for a determined period. At the same time, in response to the drive control signal, the coils 15A–5D of the second step motor 16 receive low DC voltage from the output terminal B of the voltage generating circuit 12 so as to keep the second step motor 16 inactive.

On the contrary, when another type of external signal is input to the control circuit 11 in order to drive the second step motor 16 and to stop the first step motor 14 for a determined period, the control circuit 11 outputs a drive signal of "L" intensity to the voltage generating circuit 12. As a result, the voltage generating circuit 12 outputs high DC voltage from the output terminal B and low DC voltage from the output terminal A. Synchronously with the drive signal of "L" intensity, the control circuit 11 also outputs to the drive circuit 18 a drive control signal for driving the second step motor 16, and outputs to the drive circuit 17 a drive control signal for keeping the first step motor 14 inactive. In response to the drive control signal, the drive circuit 18 sequentially switches on each of the coils 15A–5D from coil to coil, activation being caused by high DC voltage from the output terminal B of the voltage generating circuit 12. Thus, the second step motor 16 is driven for a determined period. At the same time, in response to the drive control signal, the coils 13A–3D of the first step motor 14 receive low DC voltage from the output terminal A of the voltage generating circuit 12 so as to keep the first step motor 14 inactive.

When both step motors 14 and 16 are kept inactive in this second embodiment, high voltage is supplied to one of the step motors which specifically requires a restraining force. For example, if the second step motor 16 requires the restraining force, the control circuit 11 outputs a drive signal of "L" intensity from the output terminal D to the voltage generating circuit 12. In the same manner as in driving only the second step motor 16, the voltage generating circuit 12 outputs low voltage from the output terminal A and high voltage from the output terminal B. Accordingly, the first step motor 14 is supplied with low voltage and the second step motor 16 is supplied with high voltage, causing a restraining force thereon. Synchronously with the drive signal, the control circuit 11 also outputs to both drive circuits 17 and 18 a drive control signal for restraining the step motors 14 and 16.

As described above, one of the step motors, e.g., step motor 16, is constantly energized thus restrained by high voltage without switching of the coils 15A–5D when both step motors 14 and 16 are to be kept inactive. However, the drive control signal may control the coils 15A–5D to be energized intermittently. Such conditions prevent the energized coils 15A–5D from being heated. In addition, it is possible to prevent the coils from being heated in other ways. For example, the first step motor 14, which does not need any restraining force, may be supplied with high voltage instead of low voltage while a drive control signal is output to the drive circuit 17 so as not to energize the coils 13A–3D of the first step motor 14. Furthermore, in case where the drive signal is output from the control circuit 11 to the voltage generating circuit 12 which accordingly supplies voltage to the coils 13A–3D and 15A–5D, the drive signal may be output intermittently so as to avoid heating these coils. Furthermore, the step motors 14 and 16 may be controlled by their respective voltages which predeterminately differ from each other in such a manner that: the emitter terminal F of the transistor Tr12 is supplied with voltage of a potential different from that supplied to the collector terminal G of the transistor Tr13; or the resistor R15 is designed to have a resistance value different from that of the resistor R17. Still further, if any electrical restraining force is not necessary, the resistors R15 and R17 may be removed so as not to supply voltage to the coils.

According to the aforementioned second embodiment, the driving device for the step motors is able to control the two step motors 14 and 16 by means of the single control circuit 11 and the single voltage generating circuit 12, resulting in an extremely simple circuit structure.

It is further understood by those skilled in the art that the foregoing descriptions are preferred embodiments of the disclosed device and that various changes and modifications—a control circuit for driving more than three step motors, for example--may be made in the invention without departing from the spirit and scope thereof.

What is claimed is:

1. A driving device including a plurality of step motors:
   a driver circuit connected to said respective motors,
   a voltage generating circuit means connected to said respective step motors for providing power to said respective step motors in order to activate one or more of said step motors; and
   control circuit means for activating said voltage generating circuit means in response to a drive signal or a stop signal, and for activating said driver circuits in response to a drive control signal so that: one or more step motors is rotated by sequential activation of respective coils of each said step motors; and any other step motors are stopped.

2. A driving device including a plurality of step motors according to claim 1 wherein said generating circuit means outputs a high voltage.

3. A driving device including a plurality of step motors according to claim 1 wherein said voltage generating circuit means outputs a high voltage so that said step motors are all activated.

4. A driving device including a plurality of step motors according to claim 1 wherein said voltage generating circuit means outputs a low voltage so that said step motors are all stopped.

5. A driving device including a plurality of step motors comprising:
   a driver circuit connected to said respective motors;
   a voltage generating circuit means connected to said respective step motors and having two output terminals, for both changing the output state of two output signals and providing power to said respective step motors; and
   control circuit means for activating said voltage generating circuit means in response to a drive signal or a stop signal, and for activating said driver circuits in response to a drive control signal so that: one or more step motors is rotated by sequential activation of the coils of each said step motors; and the other step motors are stopped.

6. A driving device including a plurality of step motors according to claim 5 wherein said voltage generating circuit means simultaneously outputs both a high voltage and a low voltage to said respective step motors.

7. A driving device including a plurality of step motors comprising:
   a driver circuit connected to said respective motors;
   a voltage generating circuit means connected to said respective step motors for providing power to said respective step motors in order to activate one or more of said step motors; and
   control circuit means for activating said voltage generating circuit means in response to a drive signal or a stop signal, and for activating said driver circuit in response to a drive control signal so that: at least two step motors are rotated simultaneously by sequential activation of respective coils of each said step motors; and any other step motors are stopped.

8. A driving device including a plurality of step motors according to claim 7 wherein said voltage generating circuit means outputs a high voltage.

9. A driving device including a plurality of step motors according to claim 7 wherein said voltage generating circuit means outputs a high voltage so that said motors are all activated.

10. A driving device including a plurality of step motors according to claim 7 wherein said voltage generating circuit means outputs a low voltage so that said step motors are all stopped.

11. A driving device including a plurality of step motors comprising:
    a driver circuit connected to said respective motors;
    a voltage generating circuit means connected to said respective step motors and having two output terminals for both changing the output state of two output signals and providing power to said respective step motors; and
    control circuit means for activating said voltage generating circuit means in response to a drive signal or a stop signal, and for activating said driver circuits in response to a drive control signal so that: one ore more step motors is rotated by sequential activation of the coils of each step said motors; and the other step motors are stopped, said control circuit means activating said voltage generating circuit means via a single signal conduit.

12. A driving device including a plurality of step motors according to claim 11 wherein said voltage generating circuit means simultaneously outputs both a high voltage and a low voltage to said respective step motors.

13. A driving device including a plurality of step motors according to claim 11 wherein each said driver circuit is activated via a single respective signal conduit leading from the control circuit means.

14. A driving device for driving at least two step motors, comprising:
    a driver circuit connected to each step motor:
    a single voltage generating circuit connected to each step motor for providing power to each step motor; and
    a single control circuit means for activating said voltage generating circuit means in response to a drive signal or a stop signal, and for activating said driver circuits in response to a drive control signal so that the following modes of control are obtainable;
(a) said voltage output means outputs a high signal and each of said step motors are rotated simultaneously by sequential activation of respective coils of each step motor;
(b) the voltage generating means outputs a high signal and a single step motor is rotated by sequential activation of the coils thereof and each other of said step motors is stopped; and
(c) the voltage generating circuit means outputs a low signal and all of said step motors are stopped.

* * * * *